Figure 1:
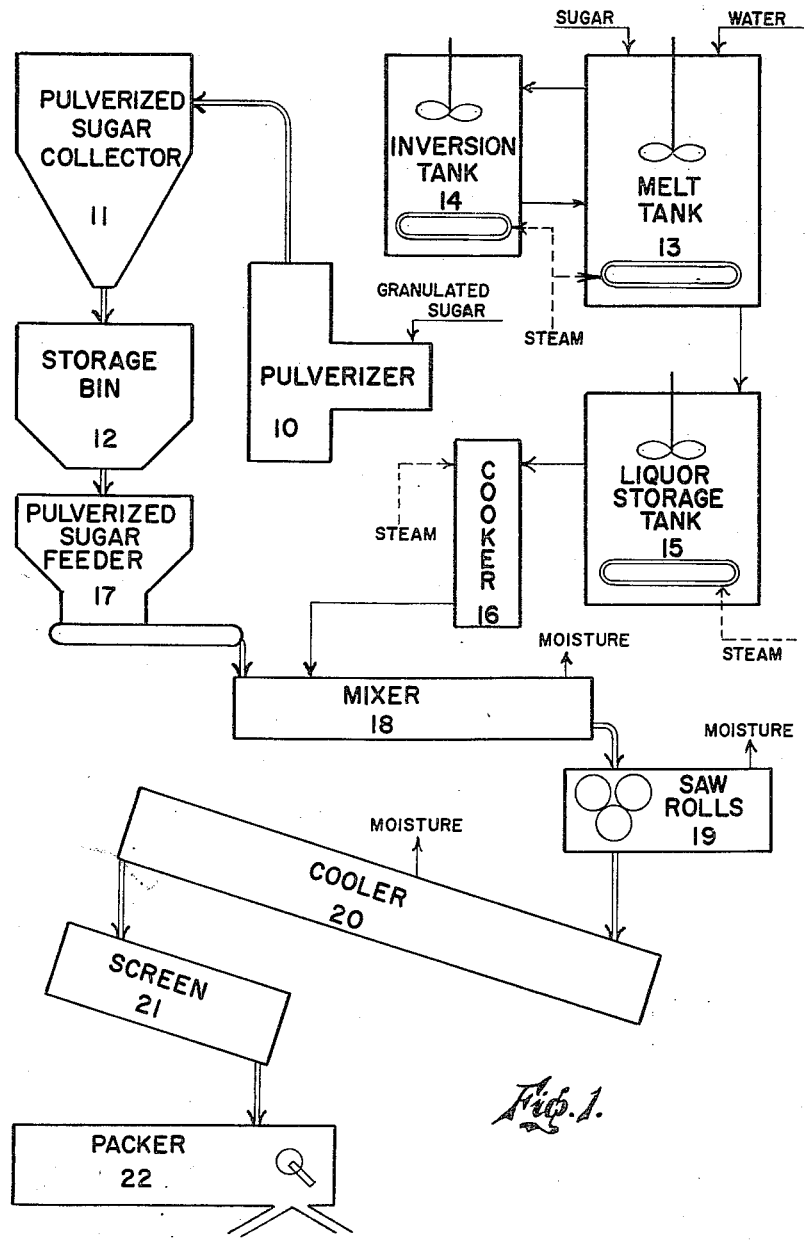

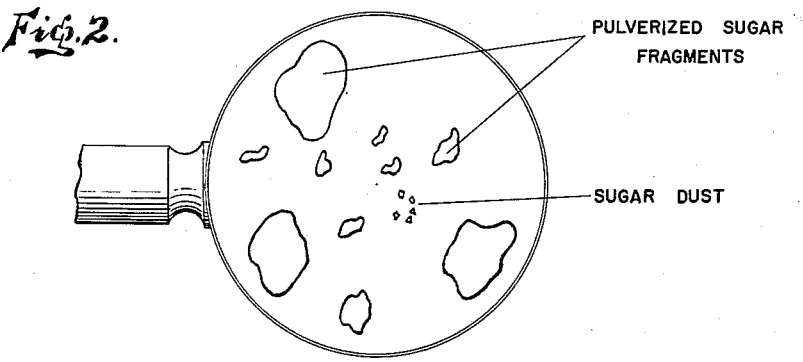
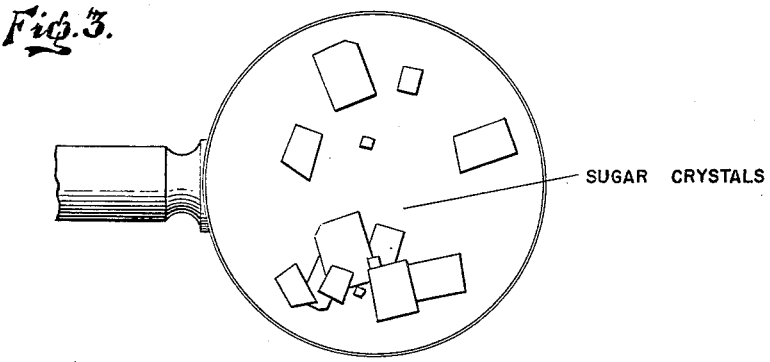
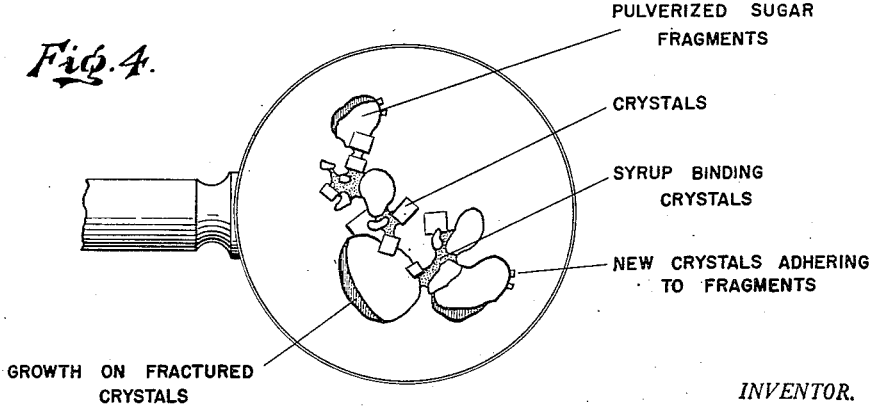

United States Patent Office 2,824,808
Patented Feb. 25, 1958

2,824,808

FONDANT AND DRY FONDANT SUGAR PRODUCT AND METHOD OF MANUFACTURE

Eugene C. Gillett and Richard N. Prince, Crockett, Calif., assignors to California and Hawaiian Sugar Refining Corporation, San Francisco, Calif., a corporation of California Application June 10, 1955, Serial No. 514,498

10 Claims. (Cl. 99—134)

This invention relates to fondants and more particularly to an improved dry granular fondant product, and an improved process for producing the same economically and in commercial quantities. The term "fondant" as used herein is to be understood as comprising a mixture of microscopic granular sugar particles and sugar syrup for use as the center of chocolate creams, fudges, icings, and similar uses.

One of the principal objects of our invention is to provide an improved dry fondant sugar product which can be converted to a creamy consistency simply by the addition of water in an amount depending upon the consistency desired in the final product.

Another object of the invention is to provide a dry fondant which when stirred with a proper amount of liquid will produce a moist fondant having a superior gloss, texture, flavor, and keeping qualities.

Another object of the invention is to provide a dry granular sugar product which may be used as the principal component in preparing fondants and icing mixtures, which when stirred with the proper amount of moisture or liquid will yield a fondant having superior gloss, texture, flavor and keeping qualities.

A further object of the invention is to provide a dry fondant material which may be kept in a free flowing condition without the use of starch or other like caking inhibitors.

Another object of the invention is to provide a novel method of manufacturing our improved product in which the complicated steps inherent in former methods of producing fondants and dry fondant sugars are eliminated, and in which the technical control of the process is greatly simplified.

Other objects and advantages of the invention will be in part evident to those skilled in the art and in part pointed out hereinafter in connection with the accompanying drawings wherein there is shown by way of illustration and not of limitation a preferred arrangement of apparatus for carrying out our invention.

In the drawings:

Figure 1 is a flow sheet showing an arrangement of steps and apparatus as employed by our method, Figures 2 and 3 are highly magnified diagrammatic illustrations showing various crystal arrangements and formations as developed by prior methods, and Figure 4 is a similar diagrammatic view showing the crystal formation and arrangement as accomplished by the present invention.

Our present invention is predicated upon the discovery that the advantages of a pre-cooked fondant can be attained by mixing pulverized sucrose, classified to obtain particles essentially all under 40 microns in size, with a pre-cooked, highly supersaturated liquor containing sucrose and invert sugar or other noncrystallizable substance such as corn syrup or glucose. It has also been discovered that a fondant having improved texture and reduced stickiness can be obtained if the classified sugar particles vary over a wide range in size below the size detectable by the tongue of a consumer. We have also found by commingling properly classified pulverized sucrose particles with a highly supersaturated solution of sucrose and invert sugar, or some other noncrystallizing substance, that a superior fondant can be produced on a large scale without the detailed and complicated control over the ingredients, cooking temperatures, cooling, and the customary creaming and drying operations as required by prior art methods.

The present invention provides a product which is also superior in many respects to fondants prepared by previous methods. When prepared as a moist fondant our product is smooth and creamy and develops a dry smooth coating while retaining a moist center. It also has a fine, even texture without gumminess or stickiness and when dehydrated to a dry fondant and mixed with a small amount of liquid, the product reconstitutes or works back into the desired moist fondant very easily. The dry fondant sugar is also much less susceptible to caking than are fondant sugars produced by previously known methods.

In order to more clearly indicate the nature and scope of this invention, a brief review of the prior art may be of assistance. The methods formerly employed in the preparation of fondants generally involve boiling together proper amounts of sucrose and glucose or invert sugar to a predetermined temperature. This temperature various for different mixtures but, in each case, must be kept within a narrow range. If the mixture is not boiled to a sufficiently high temperature, the syrup will not crystallize and if boiled to too high a temperature, crystallization can not be controlled. This boiled syrup is then carefully cooled to about 100° F. The cooling must be conducted very carefully; any agitation may induce premature crystallization and a coarse, gritty fondant results. Likewise, sugar dust or undissolved grain could induce undesired crystallization and spoil the resultant product. When this critical temperature is reached, the syrup is agitated vigorously to induce the formation of a multiplicity of fine crystals. If the temperature is too high at this time, large crystals will result and the fondant will be gritty. If the temperature is too low, crystallization will be inhibited and no fondant will result.

As an illustration of the method most commonly employed by bakers and confectioners for producing a fondant, the following example might be cited:

(a) Mix together approximately 80 parts sucrose and 20 parts liquid glucose or invert sugar with sufficient water to dissolve, agitating to prevent local overheating.

(b) Boil the mixture to 240° F. Agitation must not be used and great care must be exercised to prevent local crystal formation on the tops and sides of the cooking vessel.

(c) Cool the boiled syrup to 100° F. This step must be conducted very carefully to avoid agitation or local seeding which might induce crystallization.

(d) When the temperature reaches 100° F., the cooled syrup is beaten vigorously to induce rapid crystallization.

Material prepared in the foregoing manner is known as fondant and when properly prepared it is a white creamy mass of microscopic sugar crystals, finer than can be detected by tongue, dispersed in sugar syrup. The texture should be smooth and semi-fluid but not gummy or sticky. Outer surfaces when exposed to the air should dry to form a more or less impervious coating which protects the fondant from moisture loss and which should have a high gloss or sheen.

In the preparation of dry granular fondants for commercial use, essentially the same steps as indicated in the previous example are followed, except that a higher boiling temperature is normally employed to reduce the moisture content and, after creaming (crystallization), the moist fondant is subjected to additional steps to separate the creamy mass into small agglomerates which are further dehydrated. In the production of a product of this type by one prior inventor, the dry granular fondant material prepared by his dehydrating practices suffers from the same handicaps in manufacture as the moist fondant with respect to critical and complicated control of boiling and cooling operations. In addition, this product requires complicated processing to remove surplus moisture and, even though elaborate control methods are used, minor variations in processing oftentimes produce major changes in subsequent operations and an inferior fondant is produced. This inferior product must therefore be reprocessed with attendant loss of materials and labor. The finished product of this process also has the objectionable feature that it is susceptible to caking when packaged for retail sale.

In another prior method of producing a dry sugar mixture which may be reconstituted to fondants, sucrose or sucrose and dextrose mixtures are pulverized to a microscopic fineness below the point at which the tongue can detect individual particles. The resulting product contains a wide range of particle sizes below this maximum size, rather than a uniform size, and thus avoids some of the problems associated with other methods. Because of the fineness of the individual particles this product behaves much like a dry pre-cooked fondant and it can be formed into an acceptable fondant by admixture with a suitable fluid. This product, however, has a serious shortcoming in that it is extremely susceptible to caking. This appears to be a consequence of its very great surface area which permits ready absorption or loss of moisture, depending upon atmospheric conditions. Unless the product is protected by an anti-caking agent such as cornstarch, tricalcium phosphate, or the like, the product will set up hard, even during relatively short storage periods. The use of an anti-caking agent, as called for by this prior method, is undesirable, as such agencies frequently and seriously affect the flavor of the fondants and consequently limit their field of use.

In another prior method, a fondant is produced by the conventional boiling process and this fondant is subsequently dehydrated and pulverized, or chopped up and dehydrated. In this process a sugar liquor is boiled to the range 235–255° F. to concentrate the sugars and reduce the amount of water in the liquor. Because of the elevated temperature, however, the residual water contains considerably more sugar in solution than it will normally contain at lower temperatures. Consequently when the temperature is later reduced, a high crystallization potential is built up. It is well known that if spontaneous crystallization is avoided until this potential reaches a very high point, myriads of microscopic crystals of relatively uniform size can then be developed when the solution is vigorously agitated. The resulting fondant is then dehydrated to a dry product.

Fondants produced by this method, however, also have numerous shortcomings. For instance, since the crystals are relatively uniform in size, fondants made from this sugar tend to be sticky and produce a cloying sensation when eaten. This is particularly true when crystallization inhibitors such as glucose, as contemplated by this method, are included in the sugar liquor in order to insure that the resulting crystals will be of extremely fine size. Another difficulty results from the fact that each particle of the dehydrated product is coated with mother liquor. This mother liquor contains the materals which are difficult to crystallize and which are usually very hygroscopic. Consequently, the product is difficult to keep and tends to cake or harden in storage. Another serious difficulty is that the manufacturing process is extremely complex and must be followed very closely if a reasonably uniform and acceptable product is to be obtained as minor variations in processing conditions will effect major fluctuations in quality of the product.

In still another prior method an attempt has been made to develop a relatively dry granular fondant sugar by mixing pulverized sugar with syrups containing invert sugars or glucose. In accordance with this invention, a sugar liquor containing invert sugar is sprayed onto pulverized sucrose and mixed vigorously to obtain a dry appearing product. In this process, the sprayed syrup forms numerous small globules which are alleged to be completely surrounded by the finely pulverized sugar. In essence, this is merely a coating process.

A requirement of this method is that the final sugar must contain not more than 30% invert sugar which is supplied by a syrup containing not more than 20% water. This means that the final sugar could contain as much as 6% water. As a result the sucrose surrounding the globules of syrup is therefore exposed to moisture conditions far beyond those normally found for such sugars. For example, the moisture content of fine granulated sugar is normally in the range 0.01 to 0.03%. While powdered sucrose may contain 50% more than this, it is still far below the conditions to which the sucrose of this method is exposed and unless the product is properly dried through a granulation process, the product will become a soggy mass of unuseable material or become a solid cake of sugar in a dry atmosphere.

Fondants produced by this method have a considerable amount of detectable grittiness. This, it is believed, results from the use of pulverized sugar having a maximum size to just pass a 250 mesh screen. This means that particles as large as 61 microns may be used and such particles are appreciably beyond the point at which individual particles may be detected by the tongue. While there is some variation in the threshold of oral detectability of grittiness, as noted in the literature, this threshold is usually placed in the range between 40 and 50 microns. From this standpoint it will be evident that this fondant will not always meet the exacting quality standards of the confectionery industry.

A major disadvantage which seems to apply to all of the previously produced dry fondant sugars is the inferior quality of the icings produced from such materials. When reconstituted to fondants for use as icings, they frequently lack the highly desirable sheen or luster of freshly prepared boiled fondants. Many attempts have been made to overcome this disadvantage by incorporating excessive amounts of glucose or other conditioners in the dry product. This then produces a further disadvantage that the resulting icings become unusually sticky and give great difficulty in packaging goods on which fondants are used.

By very careful processing, using the extremely complicated techniques of the best of the previous methods of making fondant, some of the desirable characteristics could be obtained. However, not all these are attainable by any one of the previous processes. Improvement in one quality is usually made at the expense of another. For instance, in order to control crystallization, it is usual practice to incorporate larger percentages of noncrystallizing substances such as glucose in the mixture. While this assists in controlling the size of the final sugar crystals, provided other steps of the process are properly executed, it also tends to impart a stickiness or gumminess to the finished product. It likewise tends to produce crystals of uniform size which, together with the gumminess, tend to produce a cloying sensation when the confection is eaten.

In Figure 1 of the drawings we have illustrated an arrangement of apparatus and a sequence of steps for the preparation of our improved product. At the pulverizer 10, as indicated, a high quality granulated sugar is pulverized so that essentially all of the particles will pass through a 400 mesh screen. In this operation it is desirable to have most of the particles in the range from 0 to 40 microns in size; not over 10% of the particles should exceed 40 microns. This pulverizing operation can be accomplished by a number of more recently developed grinding mills. This pulverized sugar is collected in regular dust collecting equipment 11 commonly used in sugar house operations and discharged to a storage bin 12 for subsequent use in blending. At tank 13 a melt is prepared by dissolving commercial granulated sugar in water. After the granulated sugar is completely dissolved, a portion is withdrawn to tank 14, where it is inverted and returned to the remainder of the melt liquor in tank 13. As an alternate step at this point, invert syrup, frequently available in sugar refineries, or glucose, may be added directly to the melt liquor. This liquor is then passed to a liquor storage tank 15 and thence through a continuous cooker 16 where the temperature is raised to the required degree. To this cooked liquor, the pulverized sugar in storage bin 12 is added to the melt by a feeder 17 which discharges into a mixing scroll 18. This feeder may be of either the volumetric or mass type as well known to the industry. The mixture is then agitated vigorously in the mixing scroll 18, which may be of the beater type oftentimes used for this purpose in the confectionery industry. The mixture is then conducted through comminuting equipment 19 to break the mass into small granules. One particular unit which has proved suitable consists of two rotating rolls which press the mass into a ribbon. This feeds a set of gang saws located below the rolls. The saws break the mass into small granules. The particles then pass through a cooling device 20 to reduce the temperature. This cooling may be accomplished in a number of devices now used in industry. For example, water-cooled scrolls have been found quite satisfactory. Cooling drums and tray driers have also been used successfully. During passage through the mixer 18, the disintegrator 19 and the cooler 20, an air stream is passed over the product to remove excess moisture and vapors. The moisture content is thereby reduced to the desired point. After cooling, the product is passed through a screening equipment 21 to remove coarse agglomerates and is then packed at a packing station 22.

A specific example of our new process is as follows:

Ten thousand (10,000) pounds of granulated sugar is dissolved in 370 gallons of water at 176° F. to give a solution of approximately 77% solids in concentration. 290 gallons of this solution is withdrawn into an associated tank, 310 mls. of hydrochloric acid is added and the solution allowed to stand after mixing; after 20 minutes, 0.4 pounds of sodium carbonate is added and the inverted solution returned to the original dissolved sugar. From this point on the process is continuous. The solution of sugar and invert sugar is passed into a cooker at the rate of 80–90 gallons per hour and is heated to 280° F. As the liquor leaves the cooker pulverized sugar, 90% of which is less than 40 microns in size, is then simultaneously introduced into the mixer with the cooked sugar liquor at the rate of 1000 to 1200 pounds per hour. The mixture is then subjected to violent agitation which not only completes the mixing of the pulverized sugar and the cooked liquor, but also induces fine crystal formation in the supersaturated cooked liquor. The mass is now put through rolls followed by a shredding device so that the mass is broken into very small agglomerates. The resulting granular material is passed through a cooling scroll which not only reduces the temperature of the mass, but also provides sufficient retention time so that the crystallization process in the cooked liquor may proceed essentially to completion. The cooled product is then passed over screening equipment to eliminate the coarser agglomerates which are returned to the system for reprocessing and the screened material is ready for packaging. The result of this is a dry fondant material which will reconstitute readily with an appropriate amount of water to produce the improved fondant described.

While the process has been described as it applies to one particular type of dry granular fondant, it should be understood that it is not limited to the example described. For instance, the amount of moisture remaining in the finished product can be increased by reducing cooking temperature, or by varying the percentages of pulverized sucrose and pre-cooked liquor used. Cooking temperatures in the range of 260 to 300° F. are best for production of the dry granular material. The percentages of pulverized sugar has also been varied successfully from 30% to 70% of the final product and the invert sugar content can be varied from about 6% to 12% of the finished product.

In considering the development of our improved product, a brief account of the mechanics of its particle structure may be helpful. This structure has been studied under the microscope and is reasonably well understood. The new process starts with a pulverized sugar having a wide range in particle size distribution. However, substantially all of the crystal fragments are below the size detectable to the tongue. To this is added, with vigorous stirring, a sugar solution which has been boiled to a temperature of about 280° F. Ordinarily, this is the temperature range used for the production of glassy (hard) candies and is beyond the range customary for candies such as fondants which are usually produced by crystallization. At this higher temperature, crystallization is usually inhibited by the very high viscosity of the cooked sugar liquor. However, it has been discovered that by vigorously mixing this hot highly supersaturated liquor with finely pulverized sucrose, as is here described, the presence of the extremely high surface area of the pulverized sugar promotes crystallization. The result, contrary to what might be expected, is not a glassy hard product but is instead an agglomeration of crystals among the crystal fragments. This is due to the fact that the pulverized sucrose fragments offer their fractured surfaces for the reception of sucrose from the supersaturated mother liquor. New crystals are also formed. However, because of the highly supersaturated condition of the liquor, these new crystals are formed in large numbers and, due to the presence of the large surface area offered by the pulverized sugar and the high viscosity of the mother liquor, these crystals are extremely small in size. Thus, crystallization at this point results in some actual growth of the pulverized fragments and in the formation of large numbers of small crystals. Some of the latter adhere to the original fragments and some are relatively free or cemented to like crystals and as a result these particles are agglomerated into granules by a loose bonding tie of uncrystallized mother liquor.

The nature of the agglomerates found in this invention and their difference from those of previous dehydrated fondants may be noted by referring to Figures 2, 3, and 4 of the drawings. These showings are simplified sketches based on microscopic examinations and will serve to illustrate the general structures. Figure 2 shows a dry fondant sugar prepared by the pulverizing process described in United States Patent No. 2,297,764 to Holven and Junk, and illustrates the relative distribution of sizes of the sucrose fragments. Figure 3 shows the structure which might be found in a prepared dry pre-cooked fondant. In this instance, all crystals will be coated with a thin film or original mother liquor which is not here shown. Most of these crystals will be linked into agglomerates such as shown at the bottom of this view. Figure 4 shows a single agglomerate of our new product. This agglomerate, as shown, includes pulverized sugar fragments, a growth on these fractured crystals, new crystals formed from the freely crystallizing sugar liquor, other new crystals adhering to the sugar fragments, and the syrup bonding links developed from uncrystallized mother liquor.

In this interpretation of the mechanics of our process, some attention needs to be given to the role played by the mother liquor. Initially, it is a concentrated solution containing, for example, 80% sucrose ad 20% invert sugar in the dissolved solids. The invert sugar is composed of essentially equal parts of dextrose (glucose) and levulose (fructose). During the initial crystallization from the mother liquor, sucrose is deposited either as a growth on crystal fragments already present or in the form of new crystals. As a consequence, the mother liquor becomes increasingly richer in dextrose and levulose and poorer in sucrose. Ultimately, as the temperature falls, dextrose becomes supersaturated and also begins to crystallize. The final result is a mother liquor relatively rich in levulose.

This crystallization procedure can be further illustrated by following the crystallizing liquor through the various steps involved. In the example previously cited, the original solution might contain 80% sucrose and 10% dextrose and 10% levulose (20% invert sugar) on a solids basis, and about 25% water. When boiled to 280° F., the major portion of the water will have been eliminated and the composition of the syrup at this point would be approximately 6 parts of water to 94 parts of solids. The solids, of course, would be still 80% sucrose and 20% invert sugar. As this crystallizing liquor is mixed with the pulverized sugar, additional water is evaporated by the latent heat in the mixture and by the heat of crystallization, so that in the final portion of the cooked liquor only about 2½ parts of water remain. This water, at the final temperature achieved (room temperature), is capable of retaining only about 4 parts of sucrose and 5 parts of the combined dextrose and levulose. Since dextrose has so much greater crystallization potential than levulose, it will be seen that the final mother liquor will contain predominantly the levulose portion. Thus practically all of the sucrose and most of the dextrose which were present in the original cooked liquor will have been crystallized out, either on the surfaces of the crystal fragments or as new crystals and only a small quantity of the mother liquor, now rich in levulose, remains. This levulose rich binding syrup is distinctly advantageous in the new product, particularly when it is desired to reform the agglomerates into fondant. When a small quantity of water or other fluid is added to the new material, the bonds made by the concentrated mother liquor take up the fluid readily because of the hygroscopic nature of the residual bonding syrup. The result is a rapid breakdown of the agglomerates to individual fine particles. This explains why the new fondant sugar reconstitutes more readily and quickly than dehydrated fondants made by the older methods.

From the above it will be understood that the product made in accordance with the present invention has an entirely different type of structure from those made by previous methods. This difference in structure provides a product which is free of many of the disadvantages found in the fondant sugars produced by older methods. As previously mentioned, in pre-cooked fondant sugars prepared by the old tedious boiling method, all crystals are relatively uniform in size. Moreover, all crystals are surrounded by a film of the original mother liquor from which they crystallize. In the present invention, on the other hand, only a fraction of the crystals are coated with mother liquor, and, in contrast to uniform size, a wide variety of particles sizes are present. Some of these particles are crystal fragments from the pulverized sugar used in the process and some are crystals formed from the highly supersaturated sugar liquor. These particles are formed together as agglomerates, loosely bonded by weak crystallization links and by bridges of concentrated mother liquor. As distinguished from fondants produced by prior methods and as pointed out above, only a small portion of the crystals in our product are completely surrounded by a microscopic film of mother liquor. In fact, the amount of liquor available is insufficient to cover more than a portion of the available crystal surface, even in exceedingly thin films. These films are usually found in the bonds which tend to agglomerate the crystals. Since the bonds are enclosed within the agglomerates and not freely exposed, they tend to reduce the stickiness and hygroscopicity which might otherwise be associated with mother liquor films.

Dry fondants produced by former methods were extremely susceptible to changes in atmospheric conditions and consequently caking was a serious problem. This problem has been greatly reduced in the new product. The mixing of pulverized sugar with the cooked liquor has provided a different distribution of the noncrystallizing materials than has been the case heretofore. In the fondants made by previous methods each crystal was unformly coated with a syrup film. When subjected to drying conditions, this film underwent some further crystallization which cemented adjacent particles and agglomerates together. Under moist conditions, this film readily absorbed moisture, resulting in some solution of crystallizable material. This increased the caking difficulty when the material was subsequently exposed to drier conditions. In the new material, only a part of the crystals are coated with the syrup and for such crystals the coating is not uniform. This has resulted in only a minor portion of the crystal surfaces becoming active in the absorption of moisture in damp atmospheres or any further crystallization in dry atmospheres. There is accordingly a much reduced tendency toward caking. Another advantage of the new product is that it does not require the use of an anti-caking agent such as corn starch or the like as is required with finely pulverized sugars produced by previous methods.

Another feature of the material made in accordance with this invention is the wide range of particle sizes found in the product. While substantially all of the particles are below the point of detection by the tongue, the range of particle sizes imparts properties which are superior to those of previous fondants, all of which contain particles of substantially uniform size. Such fondants were gummy in texture and produced a cloying sensation when eaten. Fondant made with our new product, in contrast, has a texture which is practically free of gumminess as indicated by a clean separation or shortness when pieces of the finished fondant are pulled apart. The fondant breaks cleanly without strings of sticky syrup. Moreover, it has a pleasant taste with little or no cloying sensation evident. This in out opinion is due to the wide distribution of particle sizes which are incorporated in the new product.

Our new dry granular product may be reconstituted to a moist fondant by merely adding water, fruit juice or some other liquor normally used in confections, and stirring for 10 to 15 minutes. The fondant is then ready for use, although flavoring agents, fat and other ingredients may be added if desired. This new dry fondant also reconstitutes 10 to 20% more quickly than former dry granular fondant materials, thus saving considerable time and labor in preparing the final confection.

The fondant prepared as above has superior qualities when applied as a cake icing. The product tends to adhere tenaciously to the baked goods and, after such icings have set, they have less tendency to stick to wrapping and packaging materials. Icings made from our processed fondants develop a better sheen or gloss and provide more attractive bakery products.

Fondants produced by this method likewise have better color and flavor than other cooked fondants. As is well known, sucrose breaks down in the presence of prolonged heating. The degradation products are dark colored and highly flavored, the formation of caramel being an exaggerated condition. In our present process, however, less than half of the sucrose used is subject to the boiling operation and the resultant fondant is therefore whiter in color than cooked fondants and it has a sweetness unaffected by off-flavors.

It is to be understood that the invention is not limited to the specific examples given but may be modified in other ways which will readily be perceived by persons skilled in the art. It is believed that the product herein described has distinctly superior properties including improved color, texture, keeping quality, etc. The method of producing this fondant and the product itself are considered new to the art. The method is definitely simpler and the product can be more economically produced than by previous methods.

Having thus described our invention in such full, clear, concise and exact terms as to enable others skilled in the art to make use of and practice the same, what we claim and desire to secure by Letters Patent is:

1. An improved dry granular fondant containing less than 2% by weight moisture, comprising a mixture of finely pulverized sucrose crystal fragments having a particle size not essentially in excess of 40 microns with microscopic sucrose crystals of 25 microns or less held together in loose aggregates by partially dehydrated sugar syrup and said microscopic crystals.

2. An improved dry granular sugar product, composed of pulverized particles of sucrose primarily under 40 microns in size and microscopic crystals of sucrose and reducing sugars bonded together in agglomerate groups by the crystallizing action of a highly supersaturated sugar solution from which the aforementioned crystals of sucrose and reducing sugars were obtained.

3. An improved confectionary product which can be reconverted to fondant by addition of liquid, comprising fragments of sucrose crystals substantially all under 40 microns in size and microscopic sugar crystals loosely bonded in agglomerated groups by weak crystallization links partially coated by original mother liquor.

4. An improved dry granular confectionary product which can be reconverted to fondant by addition of liquid, comprising agglomerated groups of fragments of sucrose crystals substantially all under 40 microns in diameter and microscopic crystallized sugar particles loosely bonded together by weak crystallization links.

5. An improved dry granular fondant product with improved keeping qualities containing less than 2% moisture and which can be converted to a superior fondant, comprising a mixture of fragments of pulverized sucrose, essentially all under 40 microns in diameter and crystallized microscopic sugar particles bonded together into aggregates by partial coating with the original mother liquor of that portion of mixture from which the crystallized sugar particles were obtained.

6. A method of producing an improved sugar product, characterized by steps of processing a sucrose solution containing from 10% to 40% dextrose and levulose as non-crystallizing substances, concentrating said solution to a solids content of 90% to 95% by heating to a temperature of 260° F. to 300° F., mixing said concentrated solution with 30% to 70% of finely disintegrated sugar particles not greater than 40 microns in diameter, subjecting said mixture to violent agitation, and subsequently reducing said mixture to approximately 2% moisture content by weight.

7. A method as claimed in claim 6, characterized in that during the process of combining said supersaturated sucrose solution containing 10% to 40% of dextrose and levulose with said crystal fragments, particles of recrystallized sucrose are formed, which together with said disintegrated sugar particles are bonded together in agglomerated groups by links of uncrystallized dextrose and levulose.

8. A method as claimed in claim 6, characterized in that said sucrose solution contains 80% of sucrose and 20% of said dextrose and levulose on a solids basis.

9. A method as claimed in claim 6, characterized in that said agglomerated groups of recrystallized sucrose particles and pulverized sucrose with a 2% moisture content, are finally comminuted to a desired size.

10. A method of producing an improved fondant sugar product, characterized by the steps of preparing a solution of sucrose, inverting part of said sucrose solution into dextrose and levulose, heat treating said partially inverted solution at a temperature ranging between 260° F. and 300° F., adding pulverized sucrose having a grain size not substantially greater than 25 microns to said heated solution and vigorously agitating, breaking the resulting mass into small granules, reducing the mass to the desired temperature and moisture content, and finally comminuting said mass to the desired particle size.

References Cited in the file of this patent

UNITED STATES PATENTS

| | | |
|---|---|---|
| 2,297,764 | Holven et al. | Oct. 6, 1942 |
| 2,373,919 | Schweiger | Apr. 17, 1945 |
| 2,399,195 | Bodenheim | Apr. 30, 1946 |